US012350940B2

(12) United States Patent
Kato et al.

(10) Patent No.: US 12,350,940 B2
(45) Date of Patent: Jul. 8, 2025

(54) LIQUID EJECTION HEAD

(71) Applicant: CANON KABUSHIKI KAISHA, Tokyo (JP)

(72) Inventors: Takashi Kato, Kanagawa (JP); Yoshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 18/178,395

(22) Filed: Mar. 3, 2023

(65) Prior Publication Data

US 2023/0286281 A1 Sep. 14, 2023

(30) Foreign Application Priority Data

Mar. 14, 2022 (JP) ................................. 2022-039335

(51) Int. Cl.

| | |
|---|---|
| ***B41J 2/175*** | (2006.01) |
| ***B41J 2/14*** | (2006.01) |
| ***B41J 2/18*** | (2006.01) |

(52) U.S. Cl.

CPC ............. *B41J 2/17523* (2013.01); *B41J 2/14* (2013.01); *B41J 2/18* (2013.01); *B41J 2002/14467* (2013.01)

(58) Field of Classification Search

CPC . B41J 2/17523; B41J 2/175; B41J 2/14; B41J 2/14145; B41J 2/1404; B41J 2/18; B41J 2002/14467; B41J 2202/12; B41J 2/14016; B41J 2/14088; B41J 2/14112; B41J 2/1412; B41J 2/14129; B41J 2002/14177; B41J 2/14137; B41J 2002/14185

See application file for complete search history.

(56) References Cited

U.S. PATENT DOCUMENTS

| | | | | |
|---|---|---|---|---|
| 8,388,099 B2 * | 3/2013 | Murayama | ............ | B41J 2/1603 347/20 |
| 2015/0085017 A1 * | 3/2015 | Yamada | ................ | B41J 2/1433 347/42 |
| 2018/0201018 A1 * | 7/2018 | Mihara | ................. | B41J 2/1628 |

FOREIGN PATENT DOCUMENTS

| | | |
|---|---|---|
| WO | 2018208276 A1 | 11/2018 |
| WO | 2019078868 A1 | 4/2019 |

* cited by examiner

*Primary Examiner* — Kristal Feggins

(74) *Attorney, Agent, or Firm* — Canon U.S.A., Inc. I.P. Division

(57) ABSTRACT

The liquid ejection head includes a substrate having a first surface and a second surface which is a back surface of the first surface, a plurality of individual channels provided on the first surface, communicating with the ejection port, and recirculating the liquid, and a circulation channel communicating with the plurality of individual channels and recirculating the liquid. The circulation channel is provided on the first surface and has a connection region communicating with the outlet ports of the plurality of individual channels, a supply through-hole penetrating the substrate and supplying the liquid to the connection region, and a correct through-hole penetrating the substrate and correcting the liquid from the connection region.

17 Claims, 7 Drawing Sheets

LIQUID EJECTION HEAD

BACKGROUND

Field of the Disclosure

The present disclosure generally relates to a liquid ejection head.

Description of the Related Art

In a liquid ejection head that ejects liquid such as ink, a viscosity of the liquid near an ejection port may increase due to evaporation of volatile components in the liquid. An increment of the viscosity of the liquid may affect the ejection speed and impact accuracy of the ejected droplets. In order to suppress the increment of the viscosity of the liquid, it has been proposed to cause minute liquid circulation (microcirculation) in individual channels including the ejection port and to cause larger scale liquid circulation (macrocirculation) in a common channel communicating with the individual channels. International Publication No. WO2018/208276 discloses a liquid ejection head in which a microcirculation region is provided on one side of a substrate and a macrocirculation region is provided on the other side of the substrate, and these regions are communicated by a through hole provided in the substrate. International Publication No. WO2019/078868 discloses a liquid ejection head in which an individual channel performing microcirculation is arranged close to a common channel performing macrocirculation.

In the liquid ejection head described in International Publication No. WO2018/208276, the microcirculation region and the macrocirculation region are separated. Therefore, it is easy for the concentrated ink that has flowed out from the individual channels to reflow from the individual channels by the microcirculation. In the liquid ejection head described in International Publication No. WO2019/078868, the concentrated ink that has flowed out from the individual channels accumulates on a downstream portion by macrocirculation flow. However, when the ink is ejected from the ejection port, the ink is supplied from the inlet and outlet of the individual channels, so the concentrated ink is also supplied from the outlet to the individual channels. Therefore, these liquid ejection heads may not be able to suppress the increment of the viscosity of the ink near the ejection port.

It would be beneficial to overcome these deficiencies and suppress the increment of the viscosity of the ink near the injection port.

SUMMARY

The present disclosure advantageously provides a liquid ejection head that has an individual channel communicating with an ejection port, in which the liquid circulates in the individual channel and the reflow of the liquid that has flowed out from the individual channel into the individual channel can be suppressed.

According to some embodiments, a liquid ejection head includes a substrate having a first surface and a second surface which is a back surface of the first surface, a plurality of individual circulation channels provided on the first surface of the substrate, each of the plurality of individual circulation channels communicating with an ejection port of a liquid and recirculating the liquid, and a common circulation channel communicating with the plurality of individual circulation channels and recirculating the liquid. The common circulation channel includes a connection area provided on the first surface of the substrate and communicating with outlets of the plurality of individual circulation channels, a supply port which penetrates the substrate and supplies the liquid to the connection area, and a correct port which penetrates the substrate and corrects the liquid from the connection areas.

Further features of the present disclosure will become apparent from the following description of exemplary embodiments with reference to the attached drawings.

DESCRIPTION OF THE EMBODIMENTS

Figure 1A:
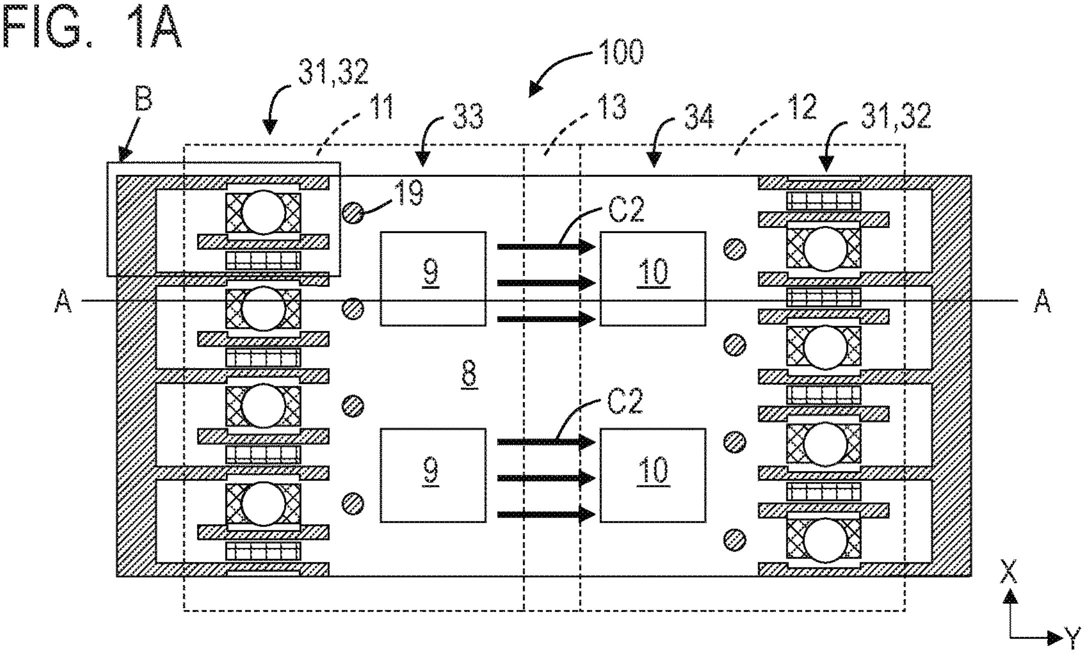
FIGS. 1A, 1B and 1C are schematic diagrams of a main part of a liquid ejection head of a first embodiment of the present disclosure.

Various exemplary embodiments, features, and aspects of the present disclosure will be described in detail below with reference to the accompanying drawings.

One of the purposes of this disclosure is to provide a liquid ejection head that has an individual channel communicating with an ejection port, in which the liquid circulates in the individual channel and the reflow of the liquid that has flowed out from the individual channel into the individual channel can be suppressed.

By referring to the drawings, some embodiments of a liquid ejection head of the present disclosure are described below. Since the embodiments described below are suitable embodiments of the present disclosure, various technically favorable limitations are applied. However, it goes without saying that the present disclosure is not limited to these embodiments. The liquid ejection head, which is one aspect of the present disclosure, is applicable to devices such as printers, copiers, facsimiles with communication systems, word processors with printer parts, and industrial recording devices combined with various processing devices in a complex manner. While the following embodiments are intended for ink ejection heads that eject the ink, the present disclosure can also be used for applications that eject liquids other than ink, such as biochip fabrication and electronic circuit printing.

In the following description and drawings, a first surface 1*a* of a substrate 1 is a surface on which an individual channel 4 and an ejection port 5 are formed, and a second surface 1*b* of the substrate 1 is a back surface of the first surface 1*a*. A first direction X is parallel to the first surface 1*a* and the second surface 1*b* of the substrate 1, and is a direction in which a channel row 31, an ejection port row 32, and through-hole rows 33-35 described below extend. The first direction X corresponds to a longitudinal direction of a liquid ejection head 100. A second direction Y is parallel to the first surface 1*a* and the second surface 1*b* of the substrate 1 and is perpendicular to the first direction X. The second direction Y corresponds to the short-side direction of the liquid ejection head 100. A Z direction is perpendicular to the first surface 1*a* and the second surface 1*b* of the substrate 1, that is, perpendicular to the first direction X and the second direction Y.

First Embodiment

Figure 1B:
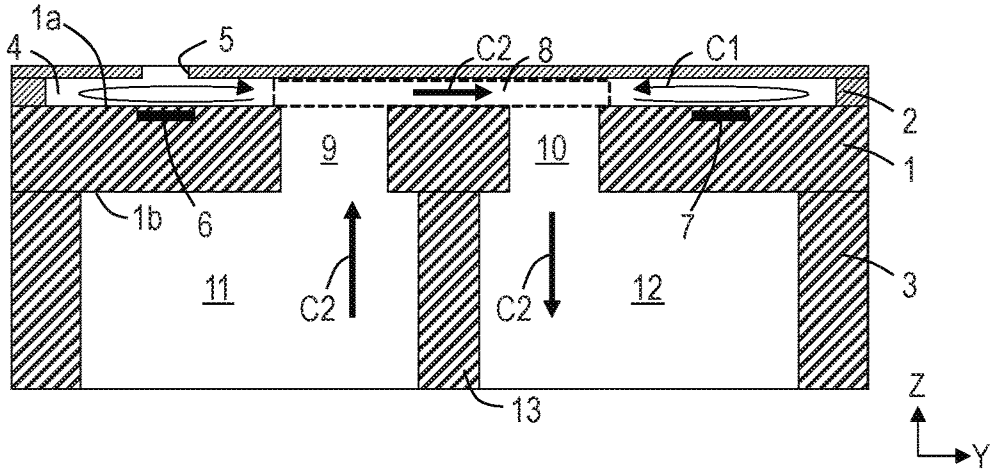
Figure 1C:
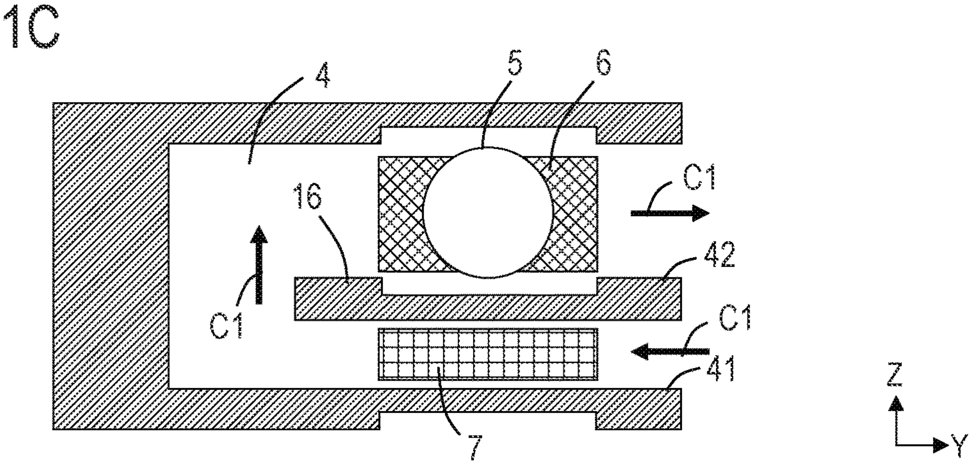

FIGS. 1A to 1C are schematic diagrams that explain in detail the vicinity of an ejection port 5 of the liquid ejection head 100 of a first embodiment. FIG. 1A is a plan view of the liquid ejection head 100 as viewed from the Z direction, showing the macrocirculation of an ink. FIG. 1B is a cross-sectional view along the A-A line of FIG. 1A as viewed from the first direction X, showing the microcirculation and the macrocirculation of the ink. FIG. 1C is an enlarged view of part B of FIG. 1A, showing the microcirculation of ink. The liquid ejection head 100 has the substrate 1, an ejection port forming member 2 provided on the substrate 1, and a channel member 3 on the opposite side of a surface on which the port forming member 2 is provided, the channel member 3 supporting the substrate 1. The substrate 1 has a parallelogram shape which is long in the first direction X and is short in the second direction Y. A plurality of individual channels 4 are formed between the substrate 1 and the port forming member 2. The port forming member 2 is formed with the ejection port 5 that communicates with each of the plurality of the individual channels 4 and ejects the ink. An energy generating element 6 that imparts energy to the ink for ejecting is formed at a position opposite to the ejection port 5 on the substrate 1. A recirculation element 7 that imparts energy to the ink for microcirculation (described later) is also formed on the substrate 1. The energy generated by the recirculation element 7 is not large enough to make the ink eject. An electrothermal conversion element or a piezo element can be used as the energy generating element 6 and the recirculation element 7.

The individual channel 4 is a circulation channel provided on the first surface 1*a* of the substrate 1 for the ink recirculation. The individual channel 4 has an approximately U-shape, and the recirculation element 7 is provided on an upstream side and an energy generating element 6 is provided on a downstream side. A partition 16 is provided between the energy generating element 6 and the recirculation element 7. The plurality of individual channels 4 form the channel row 31 extending in the first direction X, and in accordance with such arrangement, the ejection ports 5 form the ejection port row 32 extending in the first direction X. In FIG. 1A, four individual channels 4 are arranged in the first direction X, but actually more individual channels 4 are arranged in the first direction X. In this embodiment, two channel rows 31 are provided. The first surface 1*a* of the substrate 1 is provided with a connection area 8 communicating with an inlet 41 and an outlet 42 of each of the plurality of individual channels 4. The connection area 8 is arranged adjacent to the inlets 41 and outlets 42 of the plurality of individual channels 4 in the second direction Y A filter member 19 is provided in front of the outlet 42.

When the energy generating element 6 is not driven (when the ink is not ejected), the ink entering the individual channel 4 from the connection area 8 through the inlet 41 is driven by the recirculation element 7, passes through the energy generating element 6, and flows out from the outlet 42 to the connection area 8. Such flow of the ink generates a microcirculation C1 in the individual channel 4. The microcirculation C1 is the micro-circulation of the ink in a unit of the individual channel 4 caused by the recirculation elements 7. That is, the microcirculation C1 occurs respectively in the individual channel 4 including one ejection port 5, one energy generating element 6, and one recirculation element 7. When the ink is not ejected, the concentrated ink of which viscosity increases by the evaporation from the ejection port 5 flows out from the outlet 42 of the individual channel 4 by the microcirculation C1. Thus, the concentrated ink in the vicinity of the ejection port 5 is replaced with fresh ink, and clogging of the ejection port 5 can be suppressed.

Supply through-holes (supply ports) 9 each penetrating the substrate 1 and correct through-holes (correct ports) 10 each penetrating the substrate 1 are formed in the substrate 1. Supply through-holes 9 and correct through-holes 10 penetrate the substrate 1 from the first surface 1*a* to the second surface 1*b*. Seen from the Z direction, supply through-holes 9 and correct through-holes 10 are located in the connection area 8. The channel member 3 is provided with a supply channel 11 and a correct channel 12 both facing the second surface 1*b* of the substrate 1. The supply channel 11 is connected to the supply through-hole 9 and the correct channel 12 is connected to the correct through-hole 10. Seen from the Z direction, the supply channel 11 and the correct channel 12 are separated from each other by a partition 13 provided between the supply through-hole 9 and the correct through-hole 10. Although the partition 13 extends linearly in the first direction X, its shape is not limited if the supply channel 11 and the correct channel 12 can be separated. With the above described configuration, the connection area 8, the supply through-hole 9, the correct through-hole 10, the supply channel 11, and the correct channel 12 form the ink circulating channel 8-12. The ink flows into the first surface 1*a* side of the substrate 1 through the supply channel 11 and the supply through-hole 9, and then flows through the connection area 8 on the first surface 1*a* side, to the correct through-hole 10, and then flows to the correct channel 12 in this order. The supply through-hole 9 supplies the ink to the connection area 8, and then supplies the ink to each of the plurality of individual channels 4 through the connection area 8. The correct through-hole 10 corrects the ink from the connection area 8. That is, the correct through-hole 10 corrects the ink from each of the plurality of individual channels 4 through the connection area 8.

As described above, the circulation channel 8-12 is a channel in which the ink recirculates in communication with each of the plurality of individual channels 4. The ink circulation occurring in the circulation channel 8-12 is called a macrocirculation C2. The macrocirculation C2 has a range of circulation larger than that of the microcirculation C1. As described later, the macrocirculation C2 is not needed to supply the ink to individual channels 4, but is configured to recirculate ink flowing out from each of the plurality of individual channels 4. The macrocirculation C2 is generated by a recirculation element used for macrocirculation provided in the circulation channel 8-12, a circulation pump (both not shown) provided outside the substrate 1, and the like.

The plurality of supply through-holes 9 and the plurality of correct through-holes 10 are provided in the first direction X, respectively, to form a supply through-hole row 33 and a correct through-hole row 34. In FIG. 1A, two supply through-holes 9 and two correct through-holes 10 are arranged in the first direction X, but actually more supply through-holes 9 and correct through-holes 10 are arranged in the first direction X. The supply through-hole row 33 and the correct through-hole row 34 are located between the two channel rows 31 in the second direction Y, and the channel row 31 is provided on both sides of the supply through-hole row 33 and the correct through-hole row 34 in the second direction Y. That is, a pair of supply through-hole row 33 and correct through-hole row 34 are shared by the two channel rows 31 combined with them. Thus, the number of through-hole rows 33 and 34 can be suppressed. Each supply through-hole 9 and the corresponding correct through-hole 10 are adjacent to each other in the second direction Y, and the macrocirculation C2 is formed mainly from each of supply through-holes 9 toward the corresponding correct through-hole 10. Thus, in the connection area 8, the macrocirculation C2 occurs generally along the second direction Y.

Figure 7A:
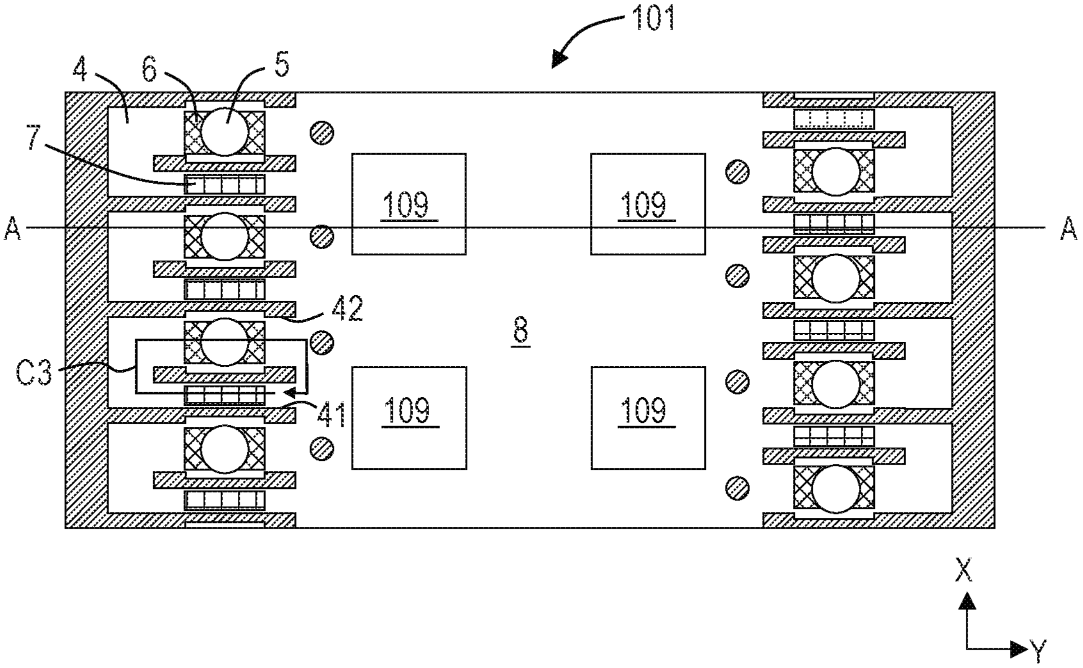
FIGS. 7A and 7B are schematic diagrams of a main part of a liquid ejection head of a comparative example.
Figure 7B:
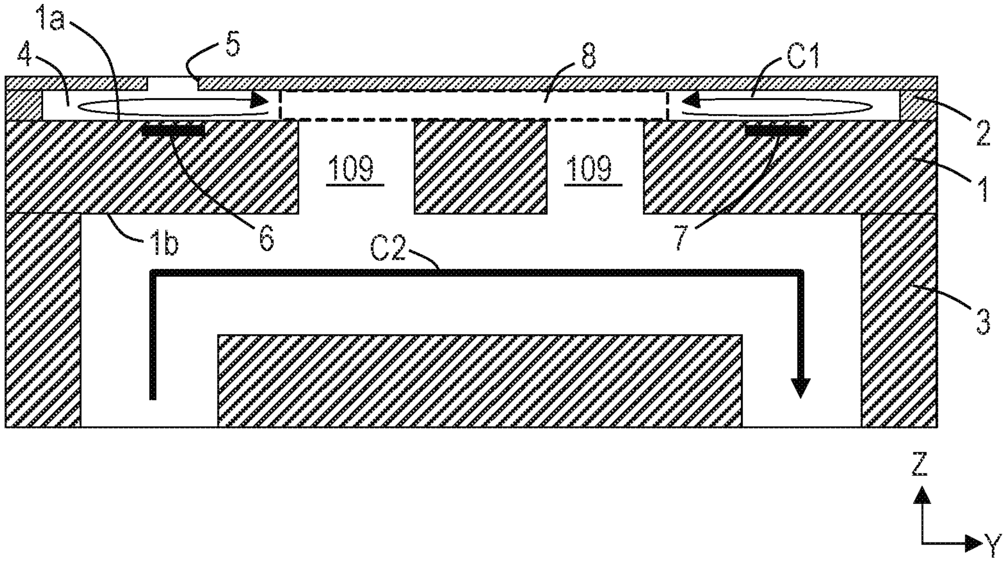

Comparative examples are described here with reference to FIGS. 7A and 7B. FIGS. 7A and 7B are schematic diagrams that explain in detail the vicinity of an ejection port 5 of a liquid ejection head 101 of a comparative example. FIG. 7A is a plan view of the liquid ejection head 101 as viewed from the Z direction, and FIG. 7B is a cross-sectional view along the A-A line of FIG. 7A as viewed from the first direction X. In the comparative example, due to the microcirculation C1 in an individual channel 4, as indicated by the arrow C3, there is a possibility that the concentrated ink flowing out from an outlet 42 of the individual channel 4 will reflow into the individual channel 4 from an inlet 41 of the individual channel 4. Because of this caused reflow of the concentrated ink, there is a possibility that the concentrated ink in the individual channel 4 may not be efficiently replaced by fresh ink. This problem can be solved by positioning the inlet 41 away from the outlet 42, as in, for example, the fourth to sixth embodiment described later, but since ink flows into the individual channel 4 from both the inlet 41 and the outlet 42 during ink ejection, the concentrated ink may flow back into the individual channel 4. In other words, even if the inlet 41 is positioned away from the outlet 42, there is a possibility that poor ejection or poor printing due to the concentrated ink may occur during ink ejection. These problems are caused by the fact that the concentrated ink flowing out from the outlet 42 of the individual channel 4 reflows into the individual channel 4 through at least either the inlet 41 or the outlet 42. Therefore, it is desirable that the concentrated ink flowing out from the outlet 42 of the individual channel 4 into the connection area 8 is discharged from the connection area 8 without flowing into the individual channel 4.

One of the causes of the above problems in the comparative example is that the individual channel 4 performing the microcirculation C1 and the circulation channel performing the macrocirculation C2 communicate only through the through-hole 109 of the substrate 1. Since the microcirculation C1 occurs only on a first surface 1*a* side of a substrate 1 and the macrocirculation C2 occurs only on a second surface 1*b* side of the substrate 1, the effect of replacing the concentrated ink in the individual channel 4 with fresh ink by the macrocirculation C2 is limited. Therefore, the concentrated ink flowing out from the outlet 42 of the individual channel 4 cannot be efficiently discharged from the connection area 8. On the other hand, in the first embodiment, since the supply channel 11 and the correct channel 12 are separated from each other by the partition 13, the macrocirculation C2 flows through the supply through-hole 9 to the connection area 8 on the first surface 1*a* side of the substrate 1, i.e., flows in the vicinity of the outlet 42 of the individual channel 4. In other words, the macrocirculation C2 flows at the same level as the microcirculation C1 in the Z direction. Concentrated ink that has flowed from the individual channel 4 to the connection area 8 by the microcirculation C1 is efficiently discharged from the connection area 8 by the macrocirculation C2, and the ink in the individual channel 4 is replaced with fresh ink. Since the concentrated ink is hard to stay in the connection area 8, the possibility of the concentrated ink flowing back from the connection area 8 to the individual channel 4 during ink ejection is also reduced. This reduces the influence of the concentrated ink flowing out from the outlet 42 of the individual channel 4. Note that although the recirculation element 7 is used as an electrothermal conversion element in the present embodiment, when a piezo element is used, the inlet 41 and outlet 42 of the individual channel 4 may be reversed from the present embodiment depending on the driving method. In this case, the same configuration as in the present embodiment can be applied.

Second Embodiment

Figure 2A:
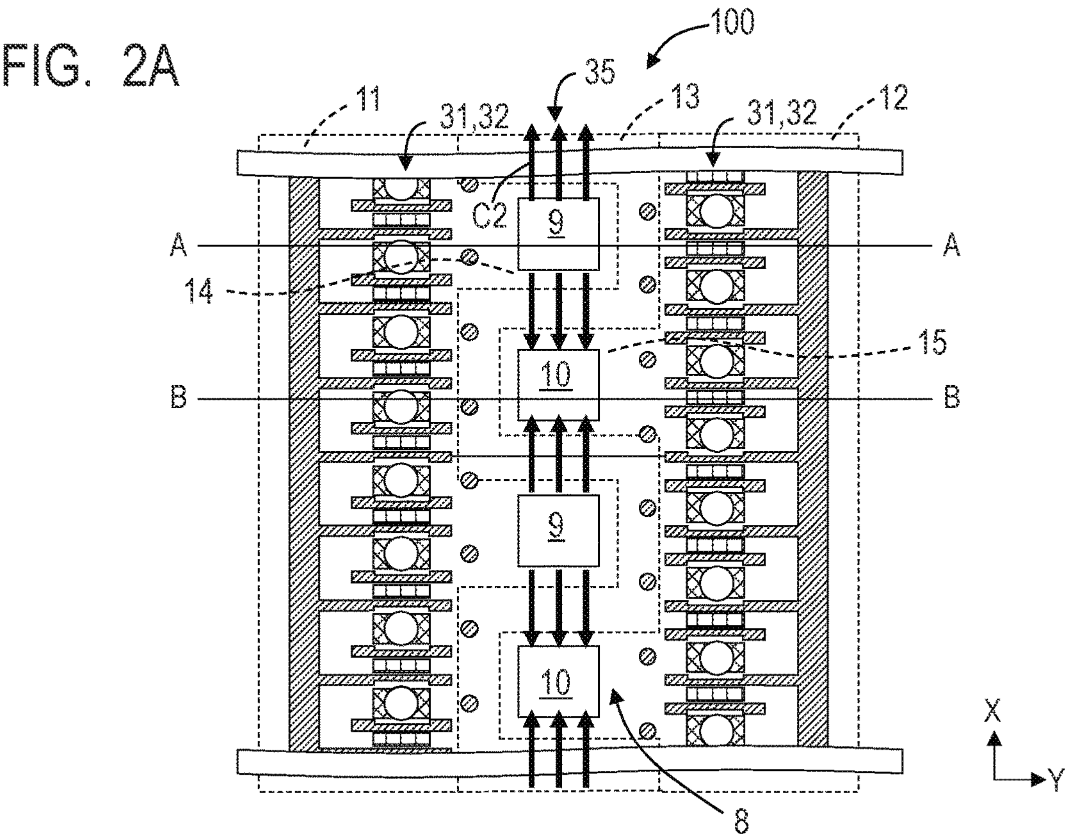
FIGS. 2A, 2B and 2C are schematic diagrams of a main part of a liquid ejection head of a second embodiment of the present disclosure.
Figure 2B:
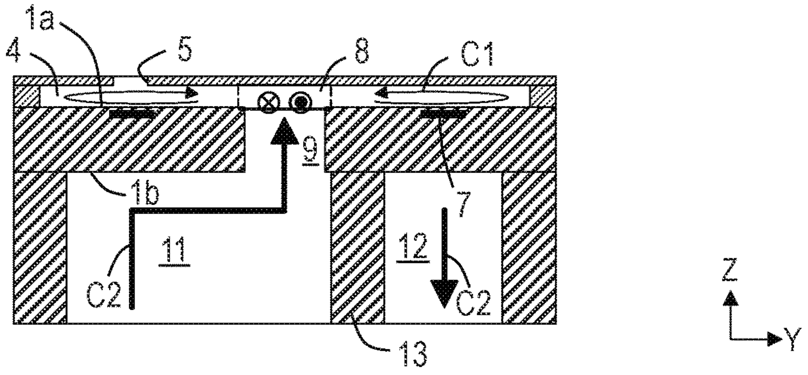
Figure 2C:
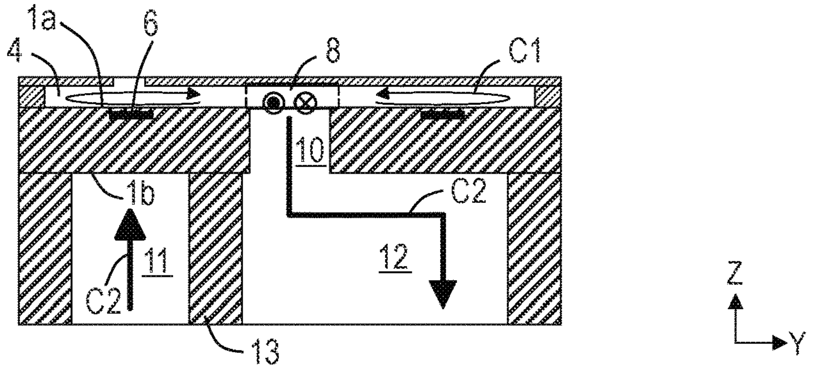

FIGS. 2A to 2C are schematic diagrams that explain in detail the vicinity of an ejection port 5 of a liquid ejection head 100 of a second embodiment. FIG. 2A is a plan view of the liquid ejection head 100 viewed from the Z direction, FIG. 2B is a cross-sectional view along the A-A line of FIG. 2A viewed from the first direction X, and FIG. 2C is a cross-sectional view along the B-B line of FIG. 2A viewed from the first direction X. FIGS. 2B and 2C show an ink microcirculation C1 and an ink macrocirculation C2. Hereafter, the differences from the first embodiment will be explained. The configuration and effects, which are omitted from the explanation, are the same as those of the first embodiment.

The supply through-hole 9 and the correct through-hole 10 cooperate to form a through-holes row 35 extending in the first direction X. The supply through-hole 9 and the correct through-hole 10 are alternately arranged in the first direction X, and the macrocirculation C2 is formed between the supply through-hole 9 and the correct through-hole 10 in the first direction X. The channel row 31 is provided on both sides of the through-holes row 35 in the second direction Y. That is, one of through-hole rows 35 is combined with two of channel rows 31. The circulation channel 8-12 has a connection area 8, the supply through-hole 9, the correct through-hole 10, a supply channel 11, and a correct channel 12.

The supply through-hole 9 and the correct channel 12 face the second surface 1*b* of the substrate 1 and communicate with the supply channel 11 and the correct through-hole 10, respectively. A partition 13 separating the supply channel 11 and the correct channel 12 extends in a meandering manner along the periphery of the supply through-hole 9 and the correct through-hole 10 when viewed from the Z direction. The supply through-hole 9 is connected to the supply channel 11 by a supply connection channel 14 branching in a comb-toothed manner from the supply channel 11 and extending in the second direction Y. Similarly, the correct through-hole 10 is connected to the correct channel 12 by a correct connection channel 15 branching in a comb-toothed form from the correct channel 12 and extending in the second direction Y.

In the first embodiment, the macrocirculation C2 flows along the second direction Y mainly between the supply through-hole row 33 and the correct through-hole row 34 in the connection area 8. In contrast, in the present embodiment, the macrocirculation C2 flows long the first direction X in the connection area 8, and the ink flow becomes dominant especially in the region along the through-hole row 35. Therefore, the macrocirculation C2 can flow in a region close to the outlet 42 of the individual channel 4. Since the supply through-hole 9 and the correct through-hole 10 are alternately arranged, the macrocirculation C2 flows more uniformly along the second direction Y. For these reasons, the concentrated ink flowing out from the outlet 42 of the individual channel 4 can be discharged more efficiently from the connection area 8. In addition, the supply through-hole 9 and the correct through-hole 10 are alternately arranged in this embodiment, so that only one through-hole row 35 is needed. Therefore, a space between the through-holes and a space between through-hole rows are reduced as compared with the first embodiment, and the size of the second direction Y of the liquid ejection head 100 can be reduced.

Third Embodiment

Figure 3A:
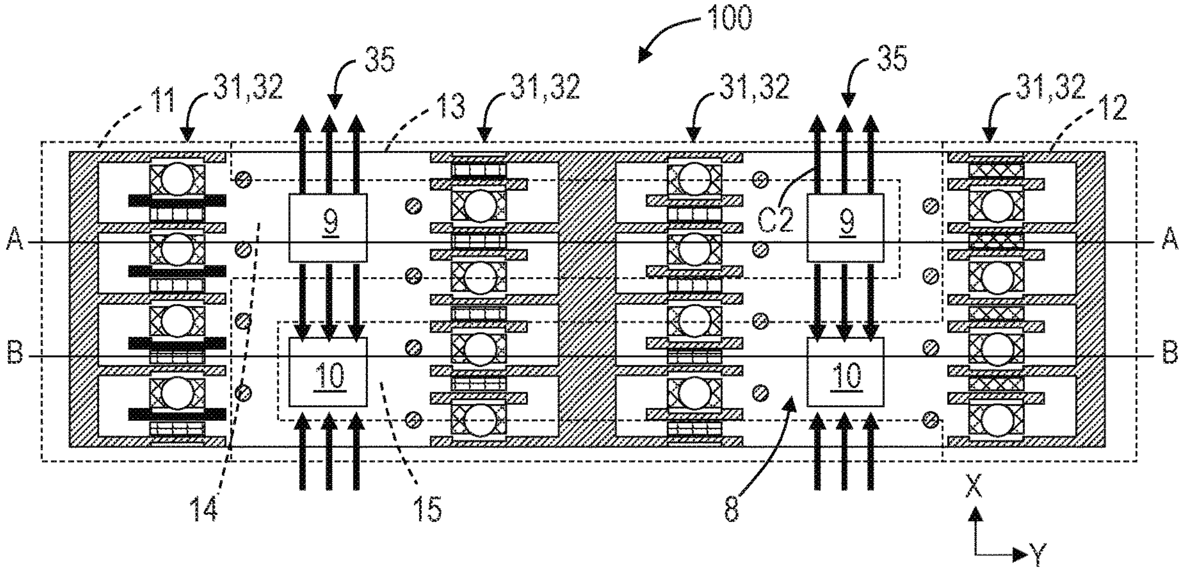
FIGS. 3A, 3B and 3C are schematic diagrams of a main part of a liquid ejection head of a third embodiment of the present disclosure.
Figure 3B:
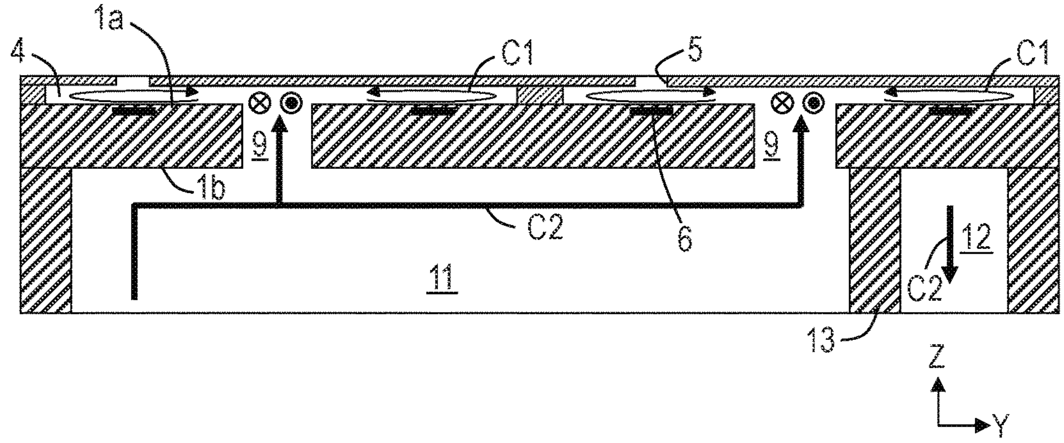
Figure 3C:
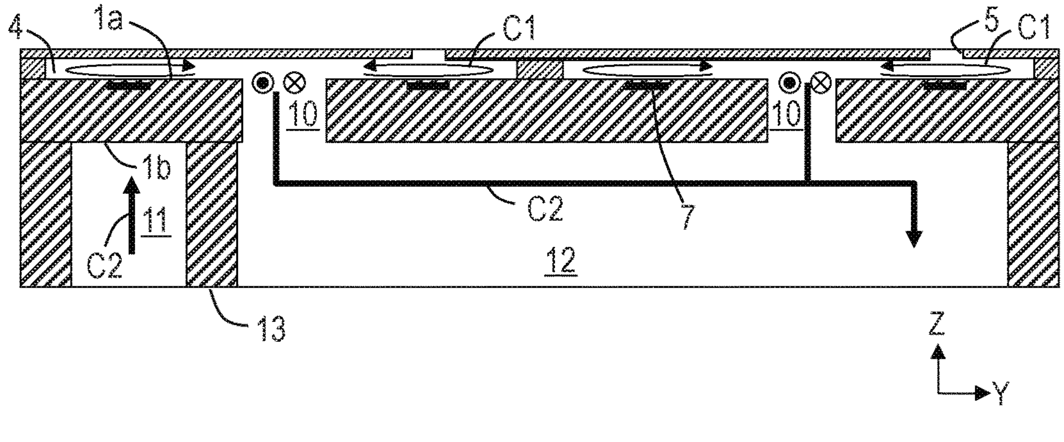

FIGS. 3A to 3C are schematic diagrams that explain in detail the vicinity of an ejection port 5 of a liquid ejection head 100 of a third embodiment. FIG. 3A is a plan view of the liquid ejection head 100 viewed from the Z direction, FIG. 3B is a cross-sectional view along the A-A line of FIG. 3A viewed from the first direction X, and FIG. 3C is a cross-sectional view along the B-B line of FIG. 3A viewed from the first direction X. FIGS. 3B and 3C show an ink microcirculation C1 and an ink macrocirculation C2. Hereafter, the differences from the second embodiment will be explained. The configuration and effects, which are omitted from the explanation, are the same as those of the first and second embodiments. A plurality of through-hole rows 35 are provided, and channel rows 31 are provided on both sides in the second direction Y of each through-hole row 35. That is, one of through-hole rows 35 is combined with two of channel rows 31.

A supply connection channel 14 branches from a supply channel 11 in a comb-toothed manner and extends in the second direction Y. The supply connection channel 14 is connected to each of the supply through-holes 9 in the same position in the first direction X of a plurality of (in this embodiment, two) through-hole rows 35. Similarly, a correct connection channel 15 branches from a correct channel 12 in a comb-toothed manner and extends in the second direction Y The correct connection channel 15 is connected to each of the correct through-holes 10 in the same position in the first direction X of the plurality of (in this embodiment, two) through-hole rows 35. The number of through-hole rows 35 is not limited to two, and three or more through-hole rows 35 may be provided. Since the plurality of through-hole rows 35 can be provided between one supply channel 11 and one correct channel 12, the number of ejection port rows 32 combined with corresponding through-hole rows 35 can also be increased. Therefore, many ejection ports 5 can be provided while suppressing the size in the second direction Y of the liquid ejection head 100.

Fourth Embodiment

Figure 4A:
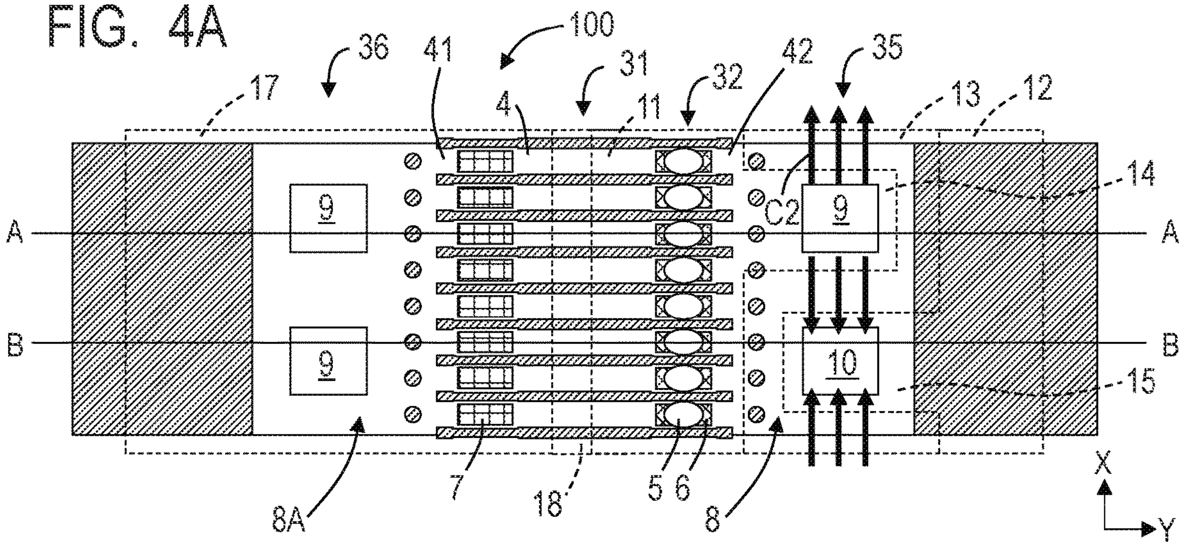
FIGS. 4A, 4B, 4C and 4D are schematic diagrams of a main part of a liquid ejection head of a fourth embodiment of the present disclosure.
Figure 4B:
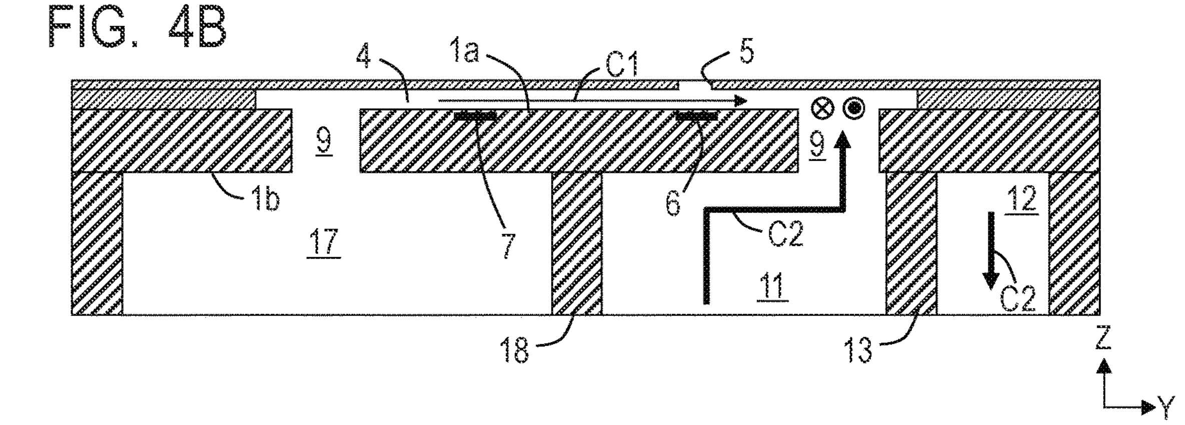
Figure 4C:
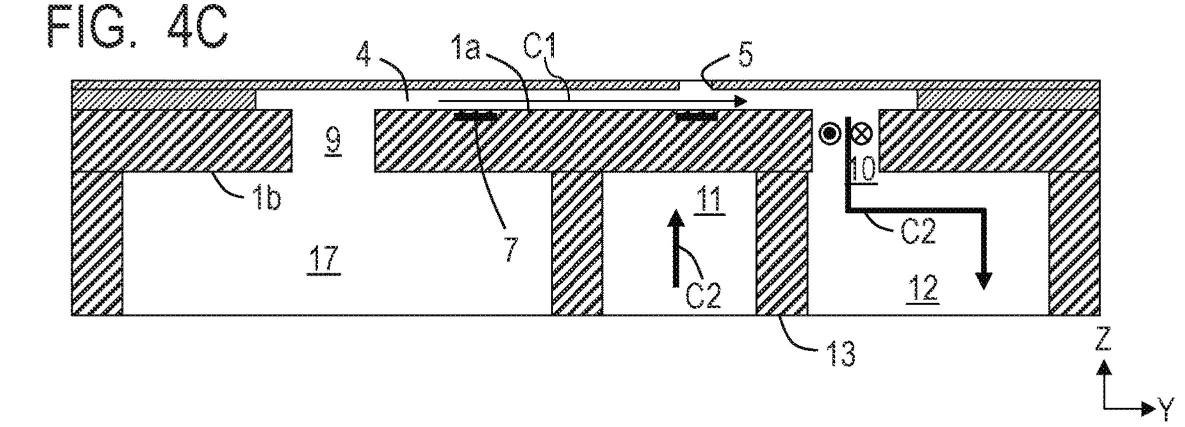
Figure 4D:
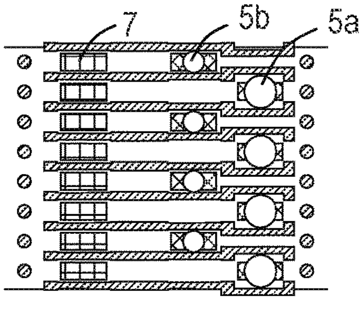

FIGS. 4A to 4D are schematic diagrams that explain in detail the vicinity of an ejection port 5 of a liquid ejection head 100 of a fourth embodiment. FIG. 4A is a plan view of the liquid ejection head 100 viewed from the Z direction, FIG. 4B is a cross-sectional view along the A-A line of FIG. 4A viewed from the first direction X, and FIG. 4C is a cross-sectional view along the B-B line of FIG. 4A viewed from the first direction X. FIGS. 4B and 4C show an ink microcirculation C1 and an ink macrocirculation C2. Also, FIG. 4D shows a main part of the plane as viewed from the Z direction for the modification example with respect to the arrangement of an ejection port 5 in this embodiment. Hereafter, the differences from the first embodiment will be mainly described. The configuration and effects, which are omitted from the explanation, are the same as those of the first embodiment.

An inlet 41 of an individual channel 4 is connected to another connection area 8*a*, which is different from a connection area 8. Through-hole rows 35 and 36 combined with the individual channel 4 are provided on both sides of the individual channel 4. The through-hole row 35 is located in the connection area 8, and the through-hole row 36 is located in another connection area 8*a*. Only a supply through-hole 9 is provided in another connection area 8*a*, and the correct through-hole 10 is not provided.

That is, the through-hole row 36 is composed of only the supply through-hole 9, and another connection area 8*a* is connected to a supply channel 17 where ink is not recirculated. The supply channel 17 and a supply channel 11 are separated from each other by a partition 18. A microcirculation C1 is different from the first to third embodiment in that it flows between different connection areas 8 and 8*a*.

The configuration of the connection area 8 is similar to that of the second embodiment. The supply through-hole 9 and a correct through-hole 10 are alternately arranged in the first direction X to form the through-holes row 35 extending in the first direction X. A macrocirculation C2 flows in the first direction X between the supply through-hole 9 and the correct through-hole 10 in the connection area 8. The supply through-hole 9 is connected to the supply channel 11 by a supply connection channel 14 branching in a comb-toothed manner from the supply channel 11 and extending in the second direction Y. Similarly, the correct through-hole 10 is connected to a correct channel 12 by a correct connection channel 15 branching in a comb-toothed manner from the correct channel 12 and extending in the second direction Y.

When the inlet 41 and the outlet 42 of the individual channel 4 are respectively connected to different connection areas 8 and 8*a*, a sufficient effect can be obtained by performing the macrocirculation C2 only in the connection area 8 connecting to the outlet 42.

Therefore, according to this embodiment, the rationalization of the pump for the macrocirculation C2 is possible. However, it is preferable that the pressure at the inlet 41 is set higher than that at the outlet 42 in order to prevent the concentrated ink from entering the individual channel 4 from the connection area 8. This can be achieved by controlling the pressure of the pump that is used for supplying the ink to the supply channel 17. Since each individual channel 4 extends linearly in the second direction Y, it has excellent placement efficiency. However, as long as the inlet 41 and the outlet 42 are respectively connected to different connection areas 8 and 8*a*, the shape of the individual channel 4 is not limited in any way and may be cured shape or broken shape. In this embodiment, the ejection port 5 can be arranged linearly in the first direction X.

However, it is also possible to arrange the outlets 5*a* and 5*b* in the first direction X as located on separate rows by shifting the outlets 5*a* and 5*b* of different sizes in the second direction Y as shown in FIG. 4D. Although not shown in the figure, the configuration with the supply through-hole row 33 and the correct through-hole row 34 shown in the first embodiment is also applicable to the present embodiment.

Fifth Embodiment

Figure 5A:
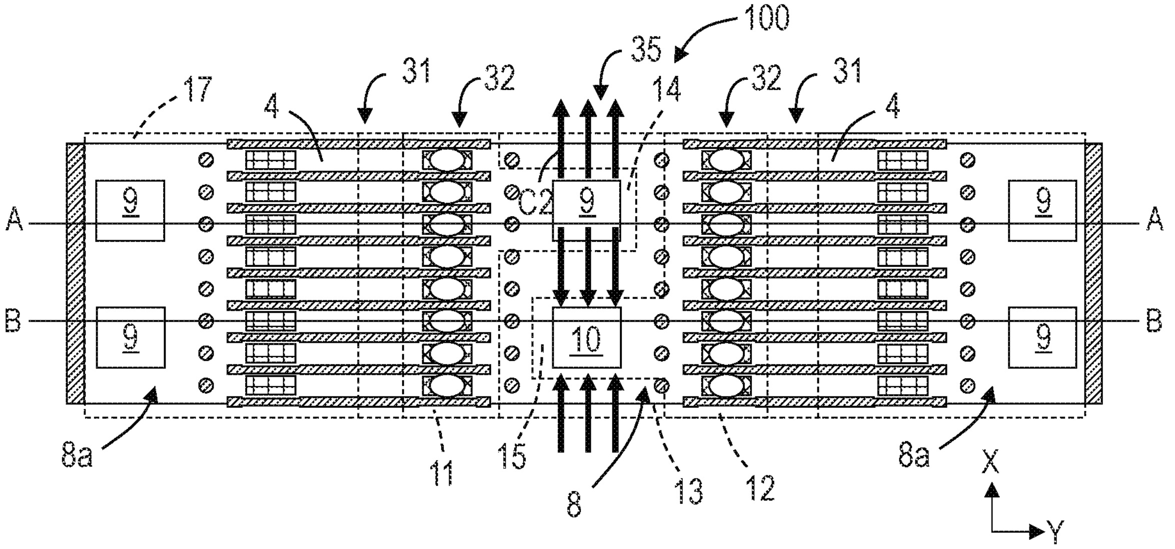
FIGS. 5A, 5B and 5C are schematic diagrams of a main part of a liquid ejection head of a fifth embodiment of the present disclosure.
Figure 5B:
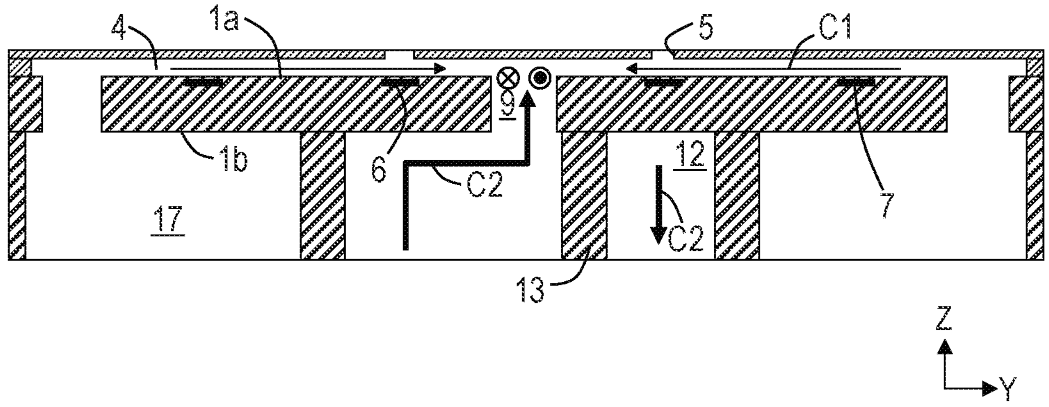
Figure 5C:
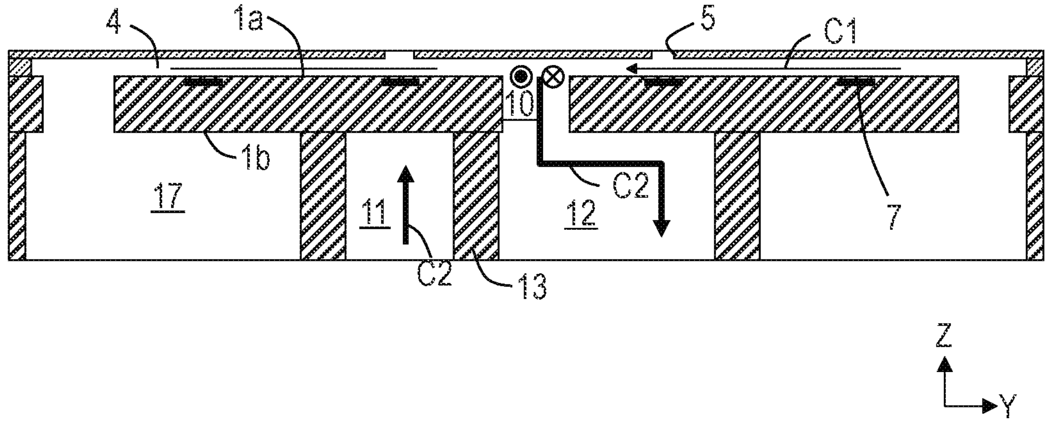

FIGS. 5A to 5C are schematic diagrams that explain in detail the vicinity of an ejection port 5 of a liquid ejection head 100 of a fifth embodiment. FIG. 5A is a plan view of the liquid ejection head 100 viewed from the Z direction, FIG. 5B is a cross-sectional view along the A-A line of FIG. 5A viewed from the first direction X, and FIG. 5C is a cross-sectional view along the B-B line of FIG. 5A viewed from the first direction X. FIGS. 5B and 5C show an ink microcirculation C1 and an ink macrocirculation C2. Hereafter, the differences from the fourth embodiment will be explained. The configuration and effects, which are omitted from the explanation, are the same as those of the first and fourth embodiments. In this embodiment, a channel row 31 combined with a through-hole row 35 is provided on both sides in the second direction Y of the through-hole row 35. Other configurations are the same as those of the fourth embodiment. Since one through-hole row 35 is shared by two channel rows 31, many ejection ports 5 can be provided while suppressing the size of the second direction Y of the liquid ejection head 100. Although not shown in the figure, the configuration with the supply through-hole row 33 and the correction through-hole row 34 shown in the first embodiment can also be applied to the present embodiment.

Sixth Embodiment

Figure 6A:
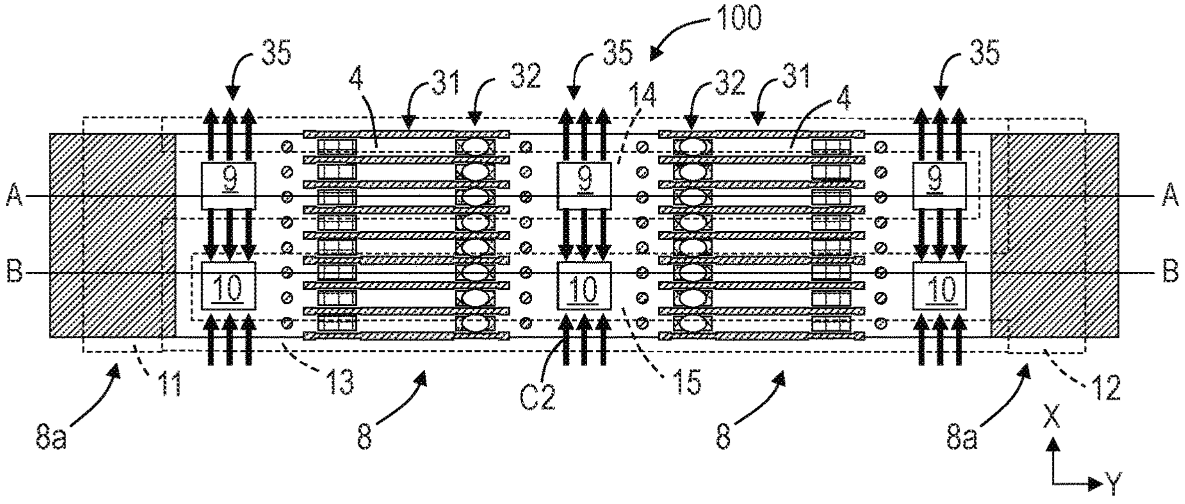
FIGS. 6A, 6B and 6C are schematic diagrams of a main part of a liquid ejection head of a sixth embodiment of the present disclosure.
Figure 6B:
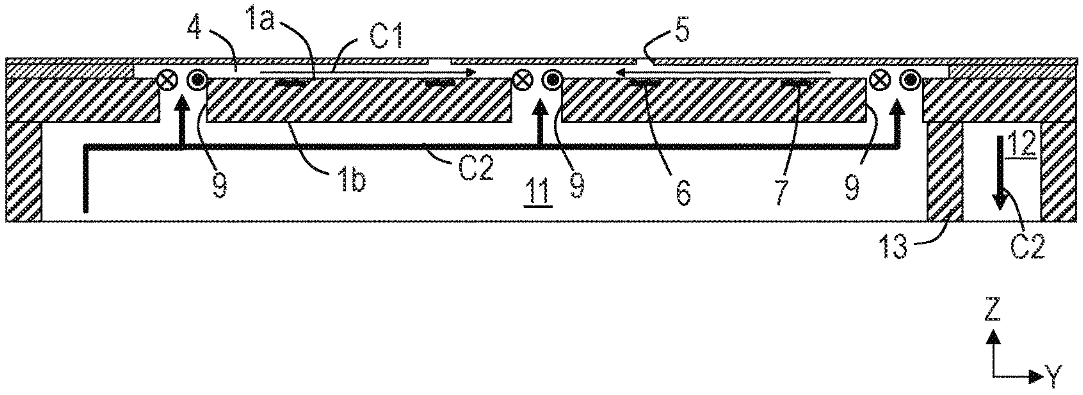
Figure 6C:
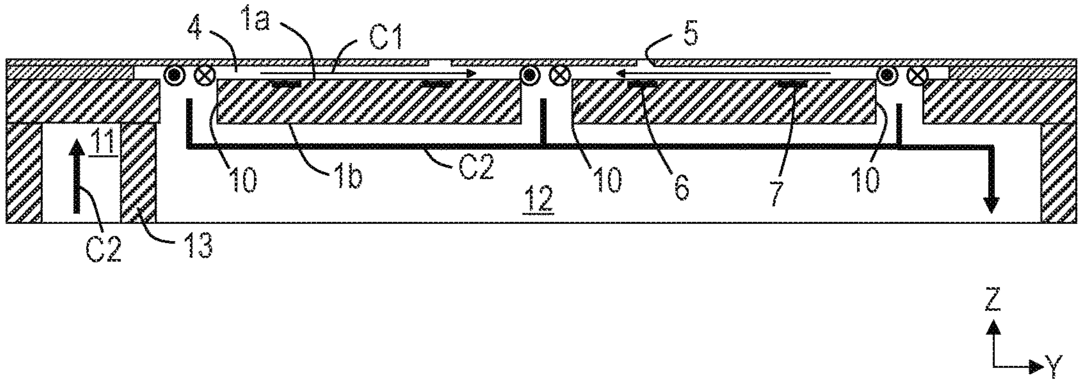

FIGS. 6A to 6C are schematic diagrams that explain in detail the vicinity of an ejection port 5 of a liquid ejection head 100 of a sixth embodiment. FIG. 6A is a plan view of the liquid ejection head 100 viewed from the Z direction, FIG. 6B is a cross-sectional view along the A-A line of FIG. 6A viewed from the first direction X, and FIG. 6C is a cross-sectional view along the B-B line of FIG. 6A viewed from the first direction X. FIGS. 6B and 6C show an ink microcirculation C1 and an ink macrocirculation C2. Hereafter, the differences from the fifth embodiment will be explained. The configuration and effects, which are omitted from the explanation, are the same as those of the fourth and fifth embodiment. In this embodiment, as in the fourth and fifth embodiment, an inlet 41 of an individual channel 4 is connected to another connection area 8*a*, which is different from the connection area 8. A plurality of through-hole rows 35 are provided, and channel rows 31 combined with through-hole rows 35 are provided on both sides of the central through-hole row 35 in the second direction Y. The connection areas 8 and 8*a* on both sides combined with the individual channels 4 are provided with through-hole rows 35 in which supply through-holes 9 and correct through-holes 10 are alternately arranged in the second direction Y. Unlike the fourth and fifth embodiment, the other connection area 8*a* are connected to the circulation channel 8-12.

As in the third embodiment, a supply connection channel 14 branches from a supply channel 11 in a comb-toothed manner and extends in the second direction Y. The supply connection channel 14 is connected to each of the supply through-holes 9 in the same position in the first direction X of the plurality of (in this embodiment, three) through-hole rows 35. Similarly, a correct connection channel 15 branches from a correct channel 12 in a comb-toothed manner and extends in the second direction Y The correct connection channel 15 is connected to each of the correct through-holes 10 in the same position in the first direction X of the plurality of (in this embodiment, three) through-hole rows 35. The number of through-hole rows 35 is not limited to three.

Since the plurality of through-hole rows 35 can be provided between one supply channel 11 and one correct channel 12 in this embodiment as in the third embodiment, the number of ejection port rows 32 combined with this can also be increased. Therefore, many ejection ports 5 can be provided while suppressing the size of the second direction Y of the liquid ejection head 100.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-039335, filed Mar. 14, 2022, which is hereby incorporated by reference herein in its entirety.

What is claimed is:

1. A liquid ejection head comprising:

a plurality of ejection ports for ejecting liquid;

a plurality of individual circulation channels each of which communicates with each of the plurality of ejection ports; and a common circulation channel communicating with the plurality of individual circulation channels, wherein in each of the plurality of individual circulation channels, a first energy generating element configured to generate energy for ejecting the liquid, and a second energy generating element configured to generate energy for circulating the liquid in the individual circulation channels are provided, wherein the common circulation channel includes:

a connection area configured to connects the plurality of individual circulation channels in a horizontal direction in a use attitude of the liquid ejection head;

a supply port configured to communicate with the connection area in a direction perpendicular to the horizontal direction and to supply the liquid to the connection area; and a correct port configured to communicate with the connection area in the direction perpendicular to the horizontal direction and to correct the liquid from the connection area.

2. The liquid ejection head according to claim 1, wherein the common circulation channel further includes a common supply channel communicating with the supply port, configured to supply the liquid to the connection area through the supply port.

3. The liquid ejection head according to claim 1, wherein the common circulation channel further includes a common correct channel communicating with the correct port, configured to correct the liquid from the connection area through the correct port.

4. The liquid ejection head according to claim 1, wherein an alignment direction of the plurality of ejection ports and an alignment direction of the first energy generating element and the second energy generating elements for the plurality of individual circulation channels are aligned.

5. The liquid ejection head according to claim 1, wherein an alignment direction of the plurality of ejection ports and an alignment direction of the first energy generating element and the second energy generating elements for the plurality of individual circulation channels intersect.

6. The liquid ejection head according to claim 4, wherein a most upstream portion of each of the plurality of individual circulation channels and a most downstream portion of the plurality of individual circulation channels, are communicate with the same connection area.

7. The liquid ejection head according to claim 6, wherein the connection area includes a first connection area and a second connection area, the most upstream portion of each of the plurality of individual circulation channels communicates with the first connection area, and the most downstream portion of each of the plurality of individual circulation channels communicates with the second connection area.

8. The liquid ejection head according to claim 1, wherein a supply channel configured to supply the liquid to the supply port and a correct channel configured to correct the liquid from the correct port are separated by a partition.

9. The liquid ejection head according to claim 1, wherein a supply channel configured to supply the liquid to the supply port communicates with a correct channel configured to correct the liquid from the correct port, only through the connection area.

10. A liquid ejection head comprising:

a substrate having a first surface and a second surface that is a back surface of the first surface;

a plurality of individual circulation channels provided on the first surface of the substrate, each of which communicates with a liquid ejection port and recirculates the liquid; and a common circulation channel communicating with the plurality of individual circulation channels to recirculate the liquid, wherein the common circulation channel includes a connection area provided on the first surface of the substrate and communicating with outlets of the plurality of individual circulation channels, and a supply port penetrating the substrate and supplying the liquid to the connection area and a correct port penetrating the substrate and correcting the liquid from the connection area, are provide to communicate with the common circulation channel.

11. The liquid ejection head according to claim 10, wherein the plurality of individual circulation channels form a channel row extending in a first direction, and the supply port and the correct port are adjacent to another in a second direction perpendicular to the first direction.

12. The liquid ejection head according to claim 11, wherein the common circulation channel includes a supply channel facing the second surface of the substrate and communicating with the supply port, and a correct channel facing the second surface of the substrate and communicating with the correct port, and wherein the supply channel and the correct channel are separated from each other by a partition provided between the supply port and the correct port when viewed from a direction perpendicular to the substrate.

13. The liquid ejection head according to claim 10, wherein the plurality of individual circulation channels form a channel row extending in a first direction, and the supply port and the correct port are alternately arranged in the first direction to form a port row extending in the first direction.

14. The liquid ejection head according to claim 13, wherein the common circulation channel includes a supply channel facing the second surface of the substrate and communicating with the supply port, and a correct channel facing the second surface of the substrate and communicating with the correct port, and wherein the supply channel and the correct channel are separated from each other by a partition extending in a meandering manner along peripheries of the supply port and the correct port when viewed from a direction perpendicular to the substrate.

15. The liquid ejection head according to claim 14, further comprising:

a supply connection channel branching from the supply channel, extending in a second direction perpendicular to the first direction, and communicating the supply channel with the supply port, and a correct connection channel branching from the correct channel, extending in the second direction, and communicating the correct channel with the correct port.

16. The liquid ejection head according to claim 13, comprising a plurality of the port rows, wherein each of the plurality of the channel rows is provided to communicating with corresponding port row of the plurality of port rows on both sides of each of the plurality of port rows in a second direction perpendicular to the first direction.

17. A liquid ejection head comprising:

a substrate having a first surface and a second surface that is a back surface of the first surface, a plurality of individual circulation channels provided on the first surface of the substrate and communicating with a liquid ejection port, and two ports each penetrating the substrate in a vicinity of the plurality of individual circulation channels, wherein a microcirculation of liquid is performed in each of the plurality of individual circulation channel and a macrocirculation of the liquid is performed in a flow path formed by the two ports and the first surface.

* * * * *